June 11, 1929.
R. J. MARX
1,717,111
PROCESS FOR THE CLARIFICATION OF LIQUIDS
AND THE RECOVERY OF SOLIDS THEREFROM
Filed June 22, 1927
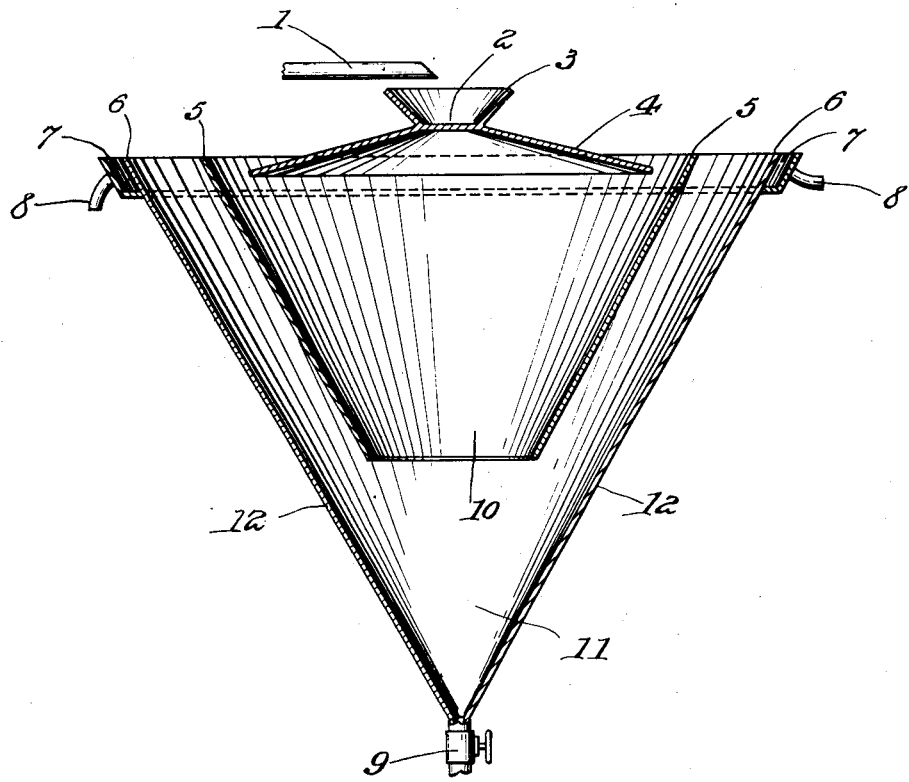
Inventor:
Robert J. Marx,
by Spear Middleton Donaldson & Hall.
Attys.

Patented June 11, 1929.

1,717,111

UNITED STATES PATENT OFFICE.

ROBERT JOSEPH MARX, OF LONDON, ENGLAND.

PROCESS FOR THE CLARIFICATION OF LIQUIDS AND THE RECOVERY OF SOLIDS THEREFROM.

Application filed June 22, 1927, Serial No. 200,703, and in Great Britain February 2, 1927.

This invention relates to a process for the clarification of liquids and the recovery of the solid matter contained therein and its objects are both to recover such foreign matter and to clarify the liquid.

Solid particles of small dimensions contained in liquids, especially when they float or are suspended therein, are generally surrounded in or encased by numerous minute air bubbles. These bubbles become so much part and parcel of the particles to which they adhere as in effect to reduce their specific gravity so long as they adhere thereto.

This state of things obtains in the case of solid particles of many kinds, such as wool, cotton, silk, cellulose, mechanical wood pulp, straw, esparto, and other fibres, as well as in the case of heavier mineral or metallic substances, particularly in a fine state of division and also in the case of effluents from various industries, such as beet sugar production. It may also happen with fresh water from rivers or other sources.

The adhesion of the air bubbles to the particles makes the removal of such particles difficult and sometimes impossible by the ordinary methods, and the smaller the bubbles, the greater the difficulty. This is particularly the case in handling washing waters from mines, white waters from paper mills and generally all effluents in which solids are contained or suspended in a finely divided state.

It has been proposed to promote the separation of fibrous and other matter from liquid in a settling tank by previously subjecting the liquid to impact as the result of a fall under gravity, with a view to causing the detachment of air bubbles from the solid particles.

My invention however consists essentially in mechanically removing the air bubbles from the solid particles to which they adhere by causing the liquid to fall from a height in the form of a thin film tending to divide up into separate drops on to a hard surface prior to its entry into a container in which the solid matter spread over such surface by the division of the drops is collected by settling down at its own proper specific gravity while the liquid flows out by convenient outlets.

The invention can be carried into effect in various types of apparatus which serve to separate liquids from solid particles contained therein as hereinbefore mentioned. It is of special advantage not only in the treatment of effluents for the recovery of solids having an industrial value, but also for the clarification of the liquid either to permit its re-use or to render it more fit for discharge into rivers by the elimination of obnoxious ingredients.

The invention is of special advantage when dealing with effluents subject to chemical changes in a relatively short space of time such as the wash and process water from beet sugar works. When such effluents are passed through apparatus adapted to enable my invention to be employed the débris of the sugar beets, or other substances can be separated from the liquid in which they are contained before they undergo organic changes by chemical reaction.

That the invention may be more readily understood, I have illustrated diagrammatically in the accompanying drawing a form of apparatus adapted to carry my invention into effect, such drawing representing a vertical section.

The effluent or other liquid to be clarified or from which solids are to be recovered is admitted at a predetermined rate of flow by pipe 1 to the inflow vessel 2, such rate being dependent upon the dimensions of the container 10, the nature of the liquid, the time of treatment required and the necessity of the overflow over the rim 3 of the inflow vessel 2, occurring in the form of so thin a layer as that it tends to divide up into a number of separate drops before it reaches the upper surface of the dished disc 4. The dimensions of the inflow vessel 2 must be so regulated as to accord with these factors. The height of the rim 3 above the disc 4 likewise varies with the nature of the liquid and its contents, but in all cases it is necessary that it should be such that the liquid is caused to reach the disc 4 in the form of drops or a very thin film approaching thereto. The impact of the drops due to the fall is sufficient to burst even very small air bubbles adhering to the minute particles of the solids contained in each drop, which particles after impact spread over the inclined dished disc 4 over the outer edge whereof the constant flow of liquid causes them to fall into that part of the container enclosed within the wall 5.

The liquid gradually fills the entire container enclosed by the outer wall 12, rising within the inner wall 5, so as eventually to approach the lower end of disc 4, and in operation the container should preferably be kept with the liquid at this level; the clarified liquid rises in the space enclosed between the walls 5 and 12 until it reaches the rim 6, over which it is allowed to flow in a thin film into the trough 7, the rate of admission, discharge, overflow and other factors being adapted to permit of this condition being fulfilled. The rate of fall of the drops is such that it is insufficient to set up currents in the liquid in the container of such a nature as to interfere with the settling down of the solids therein. On reaching the body of liquid in the vessel the solids tend to gravitate downward and are ultimately deposited in more or less concentrated form about the lower end of the container. The clarified liquid however rises between the inner wall 5 and the outer wall 12 flowing as described over the rim 6 into the trough 7 and discharging through the pipes 8. The rim 6 should be in one perfectly horizontal plane, to ensure that the overflow of the liquid occurs in a film of equal thickness at all points of the periphery. At the lower part of the container a suitable valve or the like 9 of any convenient type is provided through which the collected solids are removed continuously, the rate of discharge through such valve being proportionate to the rate of inflow and to the nature of the liquid under treatment, having regard to the condition of the solids contained therein and the rate of their deposit.

By way of example, in treating effluents from paper mills, it is desirable to obtain the recovered fibres and other solids in a consistency adapted for immediate re-use in the manufacture of paper. This condition is fulfilled by discharging about one-third of the total inflow through the discharge valve. Similarly, in treating wash water in china clay works, when a high density of the solid matter is required, the rate of discharge through the valve may amount approximately to about 10% of the total inflow.

The rate of discharge depends on the nature of the effluent treatment, and the degree of clarification of the liquid required, as well as the desired density in which the solids are to be recovered, so that no general rule for the discharge can be formulated.

The rate of admission through pipe 1 into container 2 is always such that the liquid cannot overflow the rim 3 in a greater volume than to form a thin film, while with reference to container 10, it depends on the capacity thereof and the nature of the liquid to be treated as well as the time during which it is necessary to retain the liquid in the container 10, to effect the desired concentration.

Generally speaking the capacity must be increased in proportion to the time taken by the solids to settle down and to the minuteness of the particles held in suspension in the liquid. By way of example, I prefer such container 10, when treating white water from paper mills, to be of such a size as to be adapted to hold all the liquid which enters through the inlet pipe during the course of one hour or even longer, according to the nature and size of the particles held in suspension. In treating other liquids the time factor necessarily depends upon the nature of the suspensions in the liquid as well as on their size, and no more definite general rule can be stated.

I have found that effluents, in which the fibres, solids or colloids held in suspension are not deposited in an open or closed container of ordinary type during several days with the container perfectly at rest, will deposit such fibres or solids together with the colloids (or a part thereof according to their nature) by means of my invention during a transit time of not more than 3 hours while at the same time the liquid is clarified to a great extent.

When the effluent contains in addition to fibres, loading material such as china clay, (frequently present in white water from paper machines), the fibres after being freed from the air bubbles adhering thereto have a much greater affinity for the absorption of the loading material, however finely it may be distributed in the effluent.

Many effluents treated in accordance with my invention are freed from turbidity and in suitable condition for discharge into rivers.

The invention can be applied equally well to fresh water or effluents whether the recovered solids are to be re-used or whether clarification only is to be effected.

Having now particularly described and ascertained the nature of my said invention and in what manner the same is to be performed, I declare that what I claim is:

The process of clarifying liquids and recovering solid matter held in suspension comprising flowing the liquid to be clarified into a comparatively small pool, flowing the liquid over the edge of the pool in a thin film to drop directly downward upon a hard surface disposed at a slight inclination to the horizontal, the thin film dividing into separate drops which fall from a height to impact upon the hard surface, which causes separation of all mechanically held air bubbles from the drops of water, flowing the thus air freed liquid into a larger pool and allowing the solid matter to settle out, and flowing the clarified liquid over the edge of the said larger pool.

In testimony whereof, I affix my signature.

ROBERT JOSEPH MARX.